United States Patent

Talarmo

[11] Patent Number: 5,946,306
[45] Date of Patent: *Aug. 31, 1999

[54] ALLOCATION OF TIME SLOTS IN A MOBILE COMMUNICATION SYSTEM

[75] Inventor: Reino Talarmo, Riihimäki, Finland

[73] Assignee: Nokia Telecommunications OY, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/727,474

[22] PCT Filed: Feb. 16, 1996

[86] PCT No.: PCT/FI96/00088

§ 371 Date: Oct. 16, 1996

§ 102(e) Date: Oct. 16, 1996

[87] PCT Pub. No.: WO96/25807

PCT Pub. Date: Aug. 22, 1996

[30] Foreign Application Priority Data

Feb. 17, 1995 [FI] Finland ................................. 950746

[51] Int. Cl.[6] ............................................. H04J 3/12
[52] U.S. Cl. .................................. 370/337; 370/347
[58] Field of Search ......................... 370/321, 322, 370/326, 328, 329, 336, 337, 345, 347, 348; 455/422, 434, 450, 455, 464, 39, 507, 509, 515, 516, 517

[56] References Cited

U.S. PATENT DOCUMENTS

| 4,868,811 | 9/1989 | Suzuki ................................. 370/436 |
| 5,199,031 | 3/1993 | Dahlin ................................. 370/329 |
| 5,229,995 | 7/1993 | Strawczynski et al. ............. 370/280 |
| 5,239,678 | 8/1993 | Grube et al. ....................... 455/509 |
| 5,535,429 | 7/1996 | Bergenlid et al. .................. 455/507 |
| 5,561,846 | 10/1996 | Hagio ................................. 370/337 |
| 5,583,870 | 12/1996 | Delprat et al. ...................... 370/337 |
| 5,590,400 | 12/1996 | Lopponen ........................... 455/509 |
| 5,617,412 | 4/1997 | Delprat et al. ...................... 370/281 |
| 5,633,874 | 5/1997 | Diachina et al. .................... 370/329 |

FOREIGN PATENT DOCUMENTS

| 2705181 | 11/1994 | France . |
| 2 272 133 | 5/1994 | United Kingdom . |
| 2 281 470 | 3/1995 | United Kingdom . |
| 93/10600 | 5/1993 | WIPO . |
| WO 93/1060 | 5/1993 | WIPO . |

OTHER PUBLICATIONS

Philips Telecom–PMS, Delay Estimates for TETRA Speech Transmission, Feb. 25, 1993, Draft paper Philips Research Laboratories.

ETS 300 392–2, 1994, "Radio Equipment and Systems (RES); Trans–European Trunked Radio (TETRA); Voice plus Data (V+D), Part 2; Air Interface".

Primary Examiner—Chi H. Pham
Assistant Examiner—Kwang B. Yao
Attorney, Agent, or Firm—IP Group of Pillsbury Madison & Sutro LLP

[57] ABSTRACT

A method for allocating time slots in a mobile communication system including a base station and mobile stations, the base station communicating with the mobile stations on a radio frequency divided into TDMA frames, which are further divided into time slots, of which at least one can be allocated as a traffic channel of one or more of the mobile stations, including the steps of transmitting information from the base station to a mobile station on the allocation of a time slot other than a traffic time slot used by the mobile station as a signalling time slot common to the mobile stations communicating on the radio frequency, starting to use the respective time slot as a signalling time slot common to the mobile stations communicating on the radio frequency in the signalling traffic between the base station and the mobile stations in such a manner that the mobile stations can also communicate in one or more of the traffic time slots on the radio frequency.

14 Claims, 2 Drawing Sheets

| NUMBER OF SIGNALLING TIME SLOT | NUMBER OF FIRST TRAFFIC TIME SLOT | NUMBER OF SECOND TRAFFIC TIME SLOT | NUMBER OF THIRD TRAFFIC TIME SLOT |
|---|---|---|---|
| 2B1 | 2B2 | 2B3 | 2B4 |

5,946,306

ALLOCATION OF TIME SLOTS IN A MOBILE COMMUNICATION SYSTEM

This application is the national phase of international application PCT/F196/00088 filed Feb. 16, 1996 which designated the U.S.

FIELD OF THE INVENTION

The invention relates to a method for allocating time slots in a mobile communication system comprising a base station and mobile stations, the base station communicating with the mobile stations on a radio frequency divided into TDMA frames, which are further divided into time slots, of which at least one can be allocated as a traffic channel of one or more mobile stations.

BACKGROUND OF THE INVENTION

The invention relates to the field of trunked mobile telephone systems. A trunked system is a radio network which by means of shared use of radio channels offers the services of a company-specific radio network to several organizations. Trunked systems comprise control exchanges, base stations and mobile telephones. Trunked systems typically have a cellular structure, whereby each cell has one or more radio channels which are further divided into time slots, of which one or more are used as signalling channels, while the others are used as traffic channels. The signalling channels are used for call establishment, registrations, etc. The traffic channels are used for transmitting speech and for circuit mode data connections.

The invention is suitable for use particularly in mobile telephone systems with a digital radio path. One digital mobile telephone system is described in standard ETS 300 392-2:1994, Radio Equipment and Systems (RES); Trans-European Trunked Radio (TETRA); Voice plus Data (V+D), Part 2: Air interface, ETSI, 625 pages.

The invention is intended to be applied particularly to PMR mobile telephone or mobile communication systems (PMR=Private Mobile Radio). PMR systems are typically used by companies or authority organizations. Mobile telephone systems can be based, for example, on FDMA or TDMA technology. The invention is intended to be applied especially in TDMA systems (TDMA=Time Division Multiple Access).

When channels are allocated between base stations and subscriber stations, there are typically a limited number of channels available, since there are only a small number of radio frequencies and/or time slots. In modern mobile communication systems, it is often important to allow a mobile station to have a signalling connection (Control Channel) with the base station at the same time that the mobile station in question has a telecommunication connection, i.e. a speech or data connection, with the base station. The signalling connection is needed, for instance, for transmitting to the mobile station information on other, beginning or ongoing calls, short data messages or status messages. There are prior art solutions in which a radio unit involved in a call has at suitable intervals moved for short periods to other frequencies to listen to them, i.e. monitored or scanned the desired adjacent channels. However, such a solution does not enable reliable reception of short data messages and status messages at a mobile station. Furthermore, switching the receiver of a radio unit to another frequency, i.e. for scanning, requires guard times, during which the radio unit cannot be used for communication.

In FDMA systems (FDMA=Frequency Division Multiple Access), the possibility of transmitting signalling messages or other kinds of data during calls or data calls is called in-band signalling. In this system, part of the transmission capacity of a channel is typically used during a call for signalling, which displaces the actual speech or circuit mode data.

In addition, it is known to fixedly reserve part of the traffic capacity allocated to one user for signalling. This is called out-band (channel-associated) signalling.

The problem with the prior art solutions is that the control channel capacity according to the protocol of the prior art TETRA mobile telephone system is extremely limited during speech items in individual and group calls. During a speech item, only a slow control channel is available, once a second. Certain services, and particularly implementations intended for PMR networks used by authorities, require higher signalling capacity during speech items.

SUMMARY OF THE INVENTION

The object of the present invention is to provide a method by means of which a mobile station in a TDMA. mobile communication system can transmit and receive signalling messages at the same time that it participates in a call with the base station of the mobile communication system. The object is thus to render it possible for a mobile station, while participating in a first call, to receive information, e.g. on what other calls it might participate in. It is a further object of the invention to allow the mobile station, while participating in a call, to receive short data messages and status messages.

It is a specific object of the invention to provide a method and a system by means of which a mobile station, while participating in a call in a traffic channel time slot of a frame in a TDMA system, can receive and transmit signalling messages.

This new type of method for allocating time slots is achieved with a method of the invention, which is characterized in that the method comprises the steps of transmitting information from the base station to a mobile station on the allocation of a time slot other than a traffic time slot used by the mobile station as a signalling time slot common to the mobile stations communicating on a radio frequency, starting to use the time slot as a signalling time slot common to the mobile stations communicating on the radio frequency in the signalling traffic between the base station and the mobile stations in such a manner that the mobile stations can also communicate in one or more traffic time slots.

The invention further relates to a mobile communication system comprising: mobile stations, a base station communicating with the mobile stations on a radio frequency divided into TDMA frames, which are further divided into time slots, of which at least one can be allocated as a traffic channel of one or more mobile stations, the base station comprising: an antenna, a transceiver, a control unit, and means for signalling with the mobile stations.

The mobile communication system of the invention is characterized in that the base station further comprises means for transmitting to the mobile stations communicating with the base station information on the allocation of a time slot other than a traffic time slot in the TDMA frame as a signalling time slot common to mobile stations communicating on the radio frequency, in response to which information the mobile stations communicating on the radio frequency start to use the time slot as their common signalling time slot in the signalling traffic between the base station and the mobile stations in such a way that the mobile stations can also communicate in one or more traffic time slots.

The invention further relates to a mobile station comprising: a transceiver communicating with the a base station on a radio frequency divided into TDMA frames, which are further divided into time slots, of which at least one can be allocated as a traffic channel of one or more mobile stations.

The mobile station of the invention is characterized in that the mobile station comprises: means responsive to information on the allocation of a time slot other than a traffic time slot in TDMA frame as a signalling time slot common to the mobile stations communicating on the radio frequency for commanding the mobile station to use the time slot with other mobile stations as a common signalling time slot in the signalling traffic between the base station and the mobile stations in such a manner that the mobile stations can also communicate in one or more traffic time slots of said frame.

The invention also relates to a mobile station comprising: a transceiver communicating with the base station of the mobile communication system on a radio frequency divided into TDMA frames, which are further divided into time slots, of which at least one can be allocated as a traffic channel of one or more mobile stations, the mobile station being capable of communicating with the base station in only one time slot of the frame. In this case, the mobile station of the invention is characterized in that, in response to information on the allocation of a time slot other than a traffic time slot in the TDMA frame as a signalling time slot common to mobile stations communicating on the radio frequency, the mobile station is arranged to communicate only in one or more traffic time slots of the frames.

The invention is based on the idea that information on the control, or signalling, channel and traffic channel to be allocated to a radio unit, typically a mobile station, is sent from the base station to the mobile station sufficiently accurately in one message. The mobile station can then communicate in one TDMA frame both on the signalling channel and on the traffic channel. According to the invention, the mobile station can thus both participate in a continuous telecommunication connection, e.g. a call, and receive and transmit signalling messages on the signalling channel.

An advantage of such a method for allocating time slots in a mobile communication system is that it solves the problem associated with the prior art: it allows a mobile station to start communication rapidly in a certain frame both in a traffic time slot and in a signalling time slot.

A further advantage of the invention is that it also allows a common in-call signalling time slot to be allocated only when necessary, i.e. when additional signalling capacity is of real use to the users. The invention thus enhances the flexibility of communication between the base station and a mobile station.

BRIEF DESCRIPTION OF THE DRAWINGS

In the following, the invention will be described in greater detail with reference to the accompanying drawings, in which.

DETAILED DESCRIPTION OF THE INVENTION

Time division radio systems, such as TETRA, employ a plurality of time slots in one frame in order to serve several radio units on the same radio frequency. In the arrangement of the invention, at least one time slot on each radio frequency is allocated, when necessary, as a control channel for serving all the radio units using the radio frequency in question.

A radio unit according to the first embodiment of the invention can listen to at least a traffic time slot and a control channel time slot during the same frame.

In the arrangement of the invention, information on which TETRA systems and base stations utilize the arrangement of the invention either call-specifically or permanently can be programmed into the radio units. The arrangement of the invention also allows the necessary information on an extended associated control channel to be transferred by signalling on the radio path from the base station to mobile stations, which makes the shared use with conventional radios more flexible.

Figure 1:
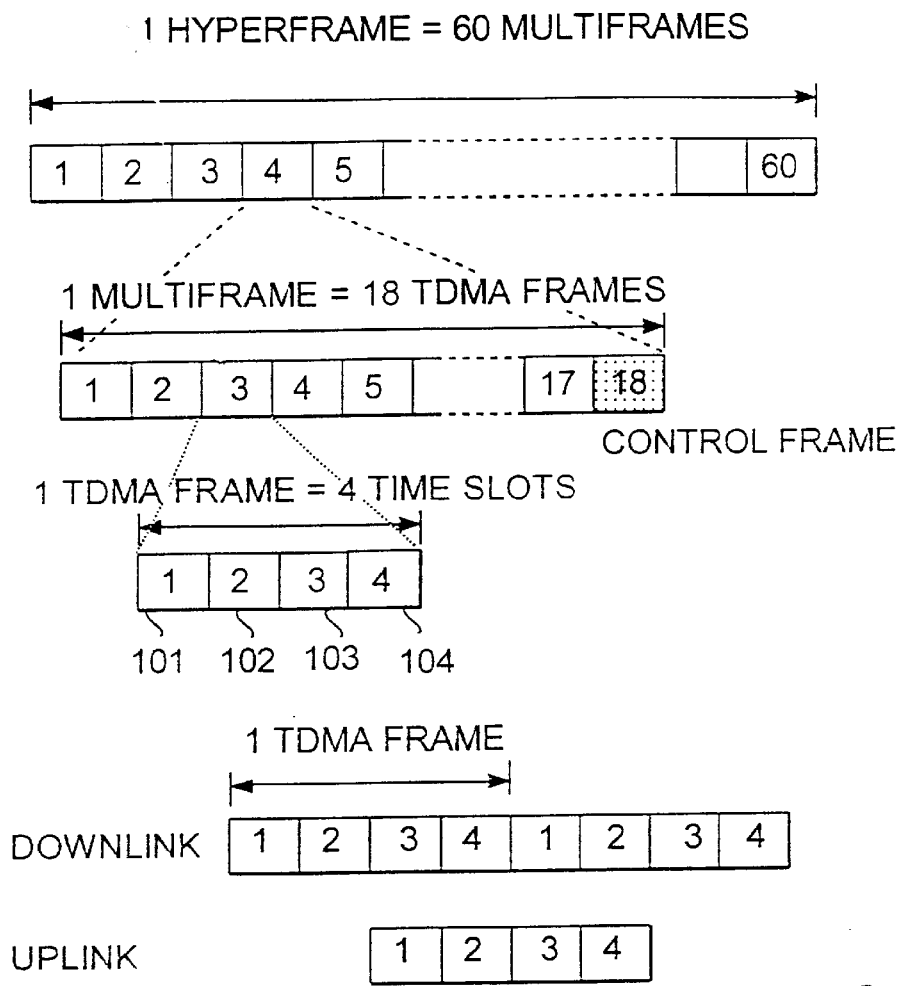
FIG. 1 shows the frame format in a TETRA radio telephone system.

FIG. 1 illustrates the frame format in a TETRA mobile communication system. According to the TETRA protocol, the uplink frequency, i.e. the contradirectional frequency, or the direction from a mobile station to the base station (MS→300, FIG. 3), is delayed on system channels by two time slots in relation to the downlink frequency, i.e. the codirectional frequency, or the direction from the base station to a mobile station (308→MS, FIG. 3). The system comprises main radio frequencies with a main signalling channel, and optionally other signalling channels and traffic channels. The present invention relates particularly to traffic channel radio frequencies, which are conventionally used as traffic channels, but the invention may also be applied on the main radio frequency.

In the frame format of the TETRA radio system, one hyperframe contains 60 multiframes, each of which contains 18 TDMA frames. The eighteenth frame of the multiframe is a control frame. Each TDMA frame is divided into four time slots 101–104. According to the invention, e.g. time slot 102 is allocated as a signalling channel, and time slots 101, 103 and 104 are allocated as traffic channels. In the figure, the multiframes are numbered from 1 to 60, the frames from 1 to 18, and the time slots from 1 to 4.

Figure 2A:
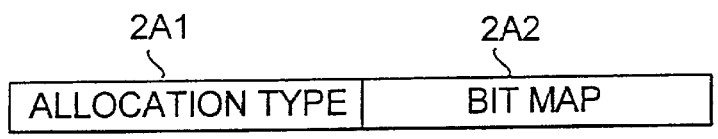
FIG. 2A shows a channel allocation message according to an embodiment of the invention to be sent to a mobile station.

FIG. 2A shows a channel allocation message according to an embodiment of the invention to be transmitted to a mobile station. According to this embodiment of the invention, the base station transmits to the mobile station a channel allocation message comprising the fields shown in FIG. 2A: allocation type 2A1 and bit map 2A2. In the solution of the invention, the allocation type indicates, for instance, whether the channel to be allocated is a signalling (channel) time slot or a traffic (channel) time slot, and also the order of these fields. The bit map 2A2 shown in FIG. 2A indicates those time slots of the frame which have been allocated for use according to the allocation type. The allocation of a certain time slot can be represented in the bit map in question, for example, by "1". For instance, in a system where each TDMA frame comprises four time slots, bit map "1010" denotes that the first time slot, represented by "1", is allocated for signalling, while the third time slot, also represented by "1", is allocated for traffic, e.g. speech. In the second example, bit map "0111" denotes that time slot 2 is used for signalling, while time slots 3 and 4 together are used for traffic, e.g. for high-rate data. If only a signalling time slot is to be allocated, bit map "1000", for example, defines time slot 1 as the signalling time slot, whereas the other time slots are not in use.

If only a traffic time slot/time slots is/are to be allocated in such an arrangement, it is possible to provide for this purpose a second allocation type, which indicates that the time slots to be allocated are used merely as traffic channels.

Figure 2B:
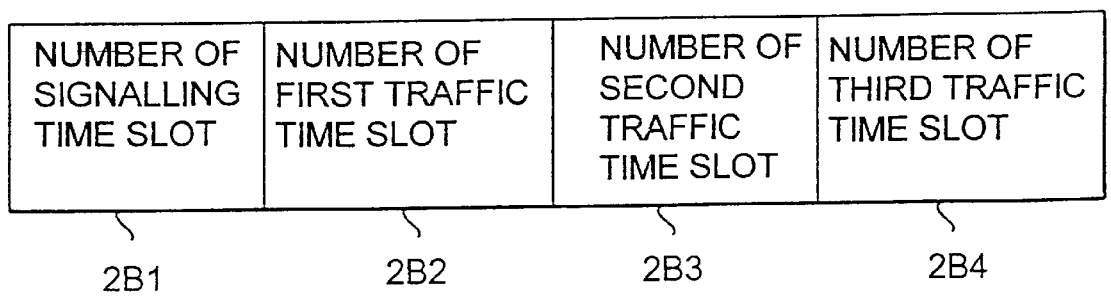
FIG. 2B shows a channel allocation message according to another embodiment of the invention to be sent to a mobile station.

FIG. 2B shows a channel allocation message according to another embodiment of the invention to be sent to a mobile station. According to this embodiment, at least the signalling time slot and the traffic time slot/time slots are indicated separately as shown in FIG. 2B. Depending on the manner in which the message has been encoded, some of the fields in the traffic time slots may be missing from the actual message. In FIG. 2B, the first field 2B1 contains the number of the desired signalling time slot. Field 2B2 contains the number of the first traffic time slot, and fields 2B3 and 2B4 contain the numbers of the second and third traffic time slots, respectively. In the case of FIG. 2B, the time slots are numbered from "1", for example, whereby "0" denotes that no time slot has been allocated to the function in question. The message "2, 3, 4", for example, denotes that time slot 2 is assigned for signalling, and time slots 3 and 4 are assigned for traffic.

Figure 3:
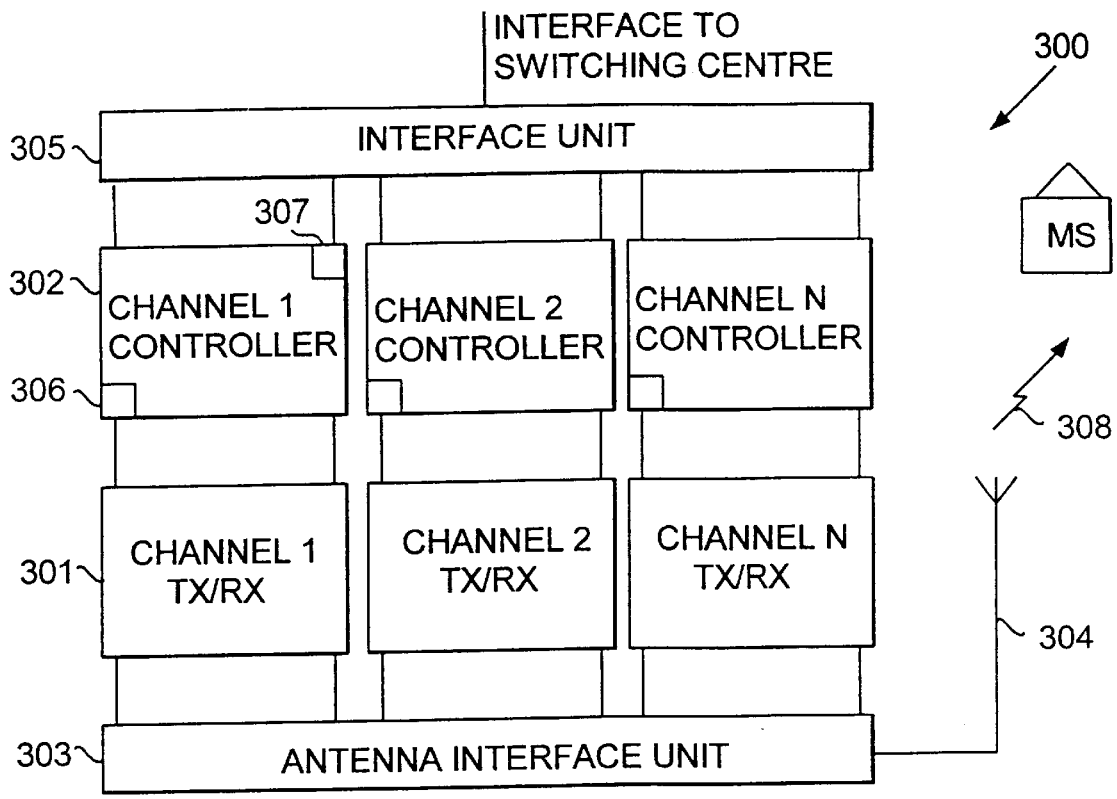
FIG. 3 shows a block diagram of a base station in a mobile communication system of the invention.

FIG. 3 illustrates the structure of a base station according to the invention. A base station may comprise either one channel or a plurality of channels. The base station of the invention comprises a plurality of radio channels, which are different radio frequencies. A radio channel or frequency is time divisional, whereby one radio frequency may have several calls or signalling connections in the different time slots of the frequency in question. The base station 300 communicates with mobile stations MS of the mobile communication system on a radio frequency which is divided into TDMA frames, which are further divided into time slots, of which at least one can be allocated as a traffic channel of one or more mobile stations.

Each radio channel is connected to a transceiver unit TX/RX 301 and a controller 302. The antenna interface unit 303 comprises circuits for combining the radio channels and for connecting them to the antenna 304, from which the radio signal is transmitted to the radio path 308.

The base station is connected to a switching center through an interface unit 305. The connection is typically digital, and a plurality of speech or signalling channels are multiplexed to the same connection.

In addition to other functions, the channel-specific controller 302 comprises means 307 for signalling with the subscriber stations. The controller 302 also transmits signalling messages to the subscriber stations, or subscribers, for instance when a call is being established or released.

The base station further comprises means 306 for transmitting to the mobile stations communicating with the base station information on the allocation of a time slot other than a traffic time slot in the TDMA frame as a signalling time slot common to mobile stations communicating on the radio frequency, in response to which information the mobile stations communicating on the radio frequency start to use the time slot as their common signalling time slot in the signalling traffic between the base station and the mobile stations in such a way that the mobile stations can also communicate in one or more traffic time slots.

Figure 4:
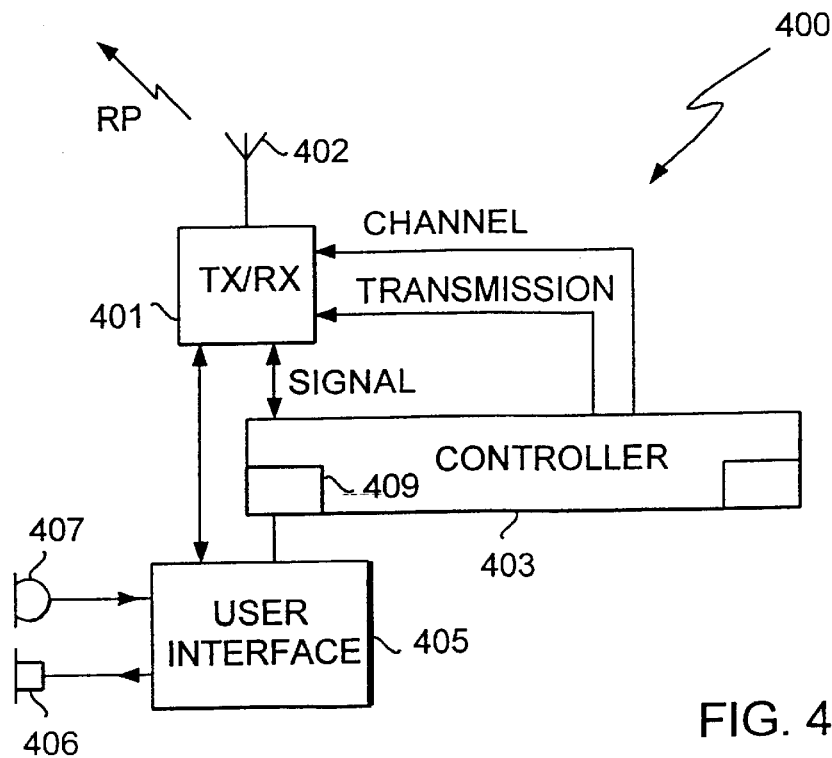
FIG. 4 shows a block diagram of a mobile station of the invention.

FIG. 4 shows a block diagram of a communicating mobile station according to the invention. FIG. 4 illustrates a typical communicating radio unit 400, i.e. a mobile telephone, mobile station or subscriber station used by a subscriber. The function of the transceiver (TX/RX) 401 is to tune to the radio channel used at a given moment. The transceiver 401 communicates with base stations or repeater stations on a radio frequency divided into TDMA frames, which are further divided into time slots, of which at least one can be allocated as a traffic channel of one or more mobile stations. The transceiver 401 is connected to an antenna 402, which is connected to the radio path RP. Radio frequencies in the range of from 60 to 1000 MHz (VHF and UHF ranges) are normally used, but it is also possible to use other frequencies. On the radio path RP, either analog or digital modulation can be employed. A radio unit can tune to and communicate on the uplink and downlink frequencies.

A user interface 405 comprises electroacoustic transducers, typically a headphone 406 and a microphone 407, and optionally buttons for starting and ending a call and for dialling. Since in a trunked system, transmission over the radio path RP is-advantageously unidirectional, the subscriber station usually also has a push-to-talk button, which must be depressed for the duration of the speech item. The push-to-talk button is not shown in FIG. 4.

The function of the controller 403 is to control the operation of the radio unit. The controller 403 is connected to a user interface 405, from which it receives signals for instance for starting and ending a call. The controller 403 may also give the user, via the user interface 405, acoustic or visual signals relating to the operation of the mobile phone and/or the mobile telephone system.

The controller 403 is connected to the transceiver TX/RX 401. The channel used by the transceiver is allocated by the controller 403, i.e. the transceiver 401 tunes to the channel, or radio frequency, allocated by the controller 403 and to an appropriate time slot. The transceiver 401 is also activated by the controller 403. The controller 403 receives and transmits signalling messages through the transceiver 401. A communicating radio unit, or mobile station 400, according to the invention can be used, for example, in a radio system comprising a radio network with at least one base station and subscriber stations and possibly one or more repeater stations that relay traffic between at least one base station and subscriber stations. In this case, the communicating mobile station comprises a memory means 411, a transceiver 401, and a controller 403 for controlling the operation of the mobile station.

The mobile station 400 according to the first embodiment of the invention comprises means 409 responsive to information on the allocation of a time slot other than a traffic time slot in the TDMA frame as a signalling time slot common to the mobile stations communicating on the radio frequency for commanding the mobile station to use the time slot with other mobile stations as a common signalling time slot in the signalling traffic between the base station and the mobile stations in such a manner that the mobile stations can also communicate in one or more traffic time slots of the frame.

According to the second embodiment of the invention, in response to information on the allocation of a time slot other than a traffic time slot in the TDMA frame as a signalling time slot common to mobile stations communicating on the radio frequency, the mobile station is arranged to communicate only in one or more traffic time slots of the frames.

The drawings and the description relating thereto are intended merely to illustrate the inventive concept. In its details, the method, mobile communication system and mobile station of the invention can be modified within the scope of the appended claims. Although the invention has been described above mainly with reference to a TETRA radio telephone system, it may also be applied in other types of mobile communication systems.

I claim:

1. A method for allocating time slots in a mobile communication system including a base station and a plurality of mobile stations, said base station communicating with said mobile stations on a radio frequency divided into a succession of TDMA frames, which are further divided into time slots, of which at least one can be allocated as a traffic channel of one or more of said mobile stations, said method comprising:

transmitting information from said base station to at least one of said mobile stations, said information causing allocation of a time slot from among said time slots, other than a traffic time slot used by said at least one mobile station, as a signaling time slot common to said mobile stations communicating on said radio frequency;

by said at least one mobile station, starting to use said time slot as a signaling time slot common to said mobile stations communicating on said radio frequency in signaling traffic between said base station and said mobile stations in such a manner that said mobile stations remain able to communicate on said radio frequency in one or more traffic time slots.

2. The method according to claim 1, wherein:

said starting to use includes a plurality of said mobile stations each listening to both a signaling time slot and at least one traffic time slot, but less than all signaling time slots and traffic time slots in each of a plurality of successive TDMA frames, and each of said mobile stations, in at least one respective TDMA frames transmitting to said base station both signaling in a signaling time slot and traffic in at least one traffic time slot.

3. The method according to claim 1, said method further comprising:

said base station transmitting to said at least one mobile station, information as to which traffic time slot or slots is or are allocated to the respective said mobile station in said frame.

4. The method according to claim 1 or 3, said method further comprising:

said base station transmitting to said at least one mobile stations, information that said allocation still keeps in force a previous allocation of said at least one traffic channel as regards said mobile station.

5. The method according to claim 1 or 3, wherein:

said allocation of a time slot in said frames to said at least one mobile station as a signaling time slot is performed by said base station, said allocation including, in a traffic channel allocation message, information as to allocation of a signaling channel.

6. The method according to claim 1 or 3, wherein:

said allocation of a time slot in said frames to said at least one mobile station as a signaling time slot is performed by allocating a first time slot in each frame to be said signaling time slot.

7. The method according to claim 1 or 3, wherein:

said allocation of a time slot in said frame to said at least one mobile station as a signaling time slot is performed by allocating a first time slot indicated by a bit map provided by said base station to said at least one mobile station to be the signaling time slot.

8. The method according to claim 1 or 3, wherein:

said information as to which time slot in said frames is allocated to be said signaling time slot common to said mobile stations communicating on said radio frequency is transmitted by including said information in a system information message transmitted from said base station to said at least one mobile station.

9. A method according to claim 1 or 3, wherein:

having received information causing allocation of a time slot other than a traffic time slot in said frames as a signaling time slot common to said mobile stations communicating on said radio frequency, at least one said mobile station, which can communicate with the base station in only one or more traffic time slots of the frames, communicates with said base station in only said traffic time slot or time slots.

10. The method according to claim 1, said method further comprising:

said base station transmitting to said at least one mobile station, information as to which traffic time slot or slots is or are allocated to the respective said mobile station in said frames; and after said transmitting by said base station to said at least one mobile station, causing allocation of a signaling time slot from among said time slots, said transmitting by said base station information as to which traffic time slot or slots is or are allocated leaving in force said allocation of said signaling time slot.

11. The method according to claim 8, wherein:

said information as to which time slot in said frames is said signaling time slot common to said mobile stations communicating on said radio frequency is included in a bit map of said system information message transmitted from said base station to said at least one mobile station.

12. A mobile communication system, said system comprising:

a plurality of mobile stations;

a base station communicating with said mobile stations on a radio frequency divided into a succession of TDMA frames which are further divided into time slots of which at least one can be allocated as a traffic channel of at least one of mobile stations, said base station comprising:

an antenna;

a transceiver;

a control unit; and means for signaling with the mobile stations; and means for transmitting by said transceiver to said mobile stations information causing allocation of a time slot, other than a traffic time slot in said TDMA frames, as a signaling time slot common to said mobile stations communicating on said radio frequency, wherein in response to said information, said mobile stations communicating on said radio frequency start to use said time slot as a common signaling time slot in signaling traffic between said base station and said mobile stations in such a way that said mobile stations remain able to communicate in one or more traffic time slot of each of a succession of said frames.

13. A mobile station, said mobile station comprising:

a transceiver arranged for communicating with a base station on a radio frequency divided into a succession of TDMA frames, which are each further divided into time slots, of which at least one can be allocated as a traffic channel of one or more mobile stations including said mobile station communicating on said radio frequency; and a commander, responsive to information as to allocation of a time slot other than a traffic time slot in said TDMA frames, as a signaling time slot common to said one or more mobile stations including said mobile station communicating on said radio frequency, which commands said mobile station to use said time slot with other mobile stations as a common signaling time slot in the signaling traffic between said base station and said mobile station, in such a manner that said mobile station remains able to communicate in one or more traffic time slots of each of a succession of said frames.

14. A mobile station, said mobile station comprising:

a transceiver communicating with a base station of a mobile communication system on a radio frequency divided into a succession of TDMA frames, which are each further divided into time slots, of which at least one can be allocated as a traffic channel of one or more mobile stations;

including said mobile station communicating on said radio frequency, said mobile station being arranged for communicating with said base station in less than all time slots of each of a succession of said frames; and said mobile station, in response to receipt of information as to allocation of a time slot other than a traffic time slot in said TDMA frames, to be a signaling time slot common to mobile stations including said mobile station communicating on said radio frequency, being arranged to communicate only in one or more traffic time slots but less than all slots of each of a succession of said frames.

* * * * *